United States Patent [19]  [11]  4,401,182
Pollman  [45]  Aug. 30, 1983

[54] VARIABLE DISPLACEMENT HYDRAULIC DRIVE WITH DISCONNECT

[75] Inventor: Frederic W. Pollman, Ames, Iowa

[73] Assignee: Sundstrand Corporation, Rockford, Ill.

[21] Appl. No.: 214,927

[22] Filed: Dec. 10, 1980

[51] Int. Cl.³ .......................................... B60K 41/00
[52] U.S. Cl. ..................................... 180/242; 60/420; 60/445; 60/484; 91/473; 180/197, 307
[58] Field of Search ............... 180/242, 243, 197, 60, 180/247, 253, 271, 306–308; 280/91; 74/624, 785, 731; 60/399, 420, 422, 424, 427, 429, 431, 433, 436, 444, 447, 449, 451, 452, 484, 488, 494, 495; 91/59, 473, 475

[56] References Cited

U.S. PATENT DOCUMENTS

| | | | |
|---|---|---|---|
| 3,217,826 | 11/1965 | Carter et al. | 180/197 |
| 3,458,005 | 7/1969 | Malm et al. | 180/243 |
| 3,724,583 | 4/1973 | Caldwell | 60/420 X |
| 3,736,732 | 6/1973 | Jennings et al. | 56/10.9 |
| 4,040,254 | 8/1977 | Knapp et al. | 60/420 |
| 4,080,850 | 3/1978 | Bubula et al. | 74/731 X |
| 4,241,577 | 12/1980 | Baldauf | 180/308 X |
| 4,306,467 | 12/1981 | Pollman | 74/688 |

FOREIGN PATENT DOCUMENTS

| | | | |
|---|---|---|---|
| 554262 | 1/1957 | Italy | 180/242 |
| 2002884 | 2/1979 | United Kingdom | 180/242 |

Primary Examiner—Joseph F. Peters, Jr.
Assistant Examiner—Mitchell J. Hill
Attorney, Agent, or Firm—Ted E. Killingsworth; Michael B. McMurry; Harold A. Williamson

[57] ABSTRACT

A vehicle propulsion system is provided with an auxiliary hydraulic drive having a variable displacement motor connected to ground engaging wheels by a clutch. A multiple position control has a first position which causes clutch engagement and positions a motor displacement member in a position which permits fluid drive of the motor. The control has a second position which causes clutch disengagement and positions the motor displacement member in a zero displacement condition which prevents fluid drive of the motor. Preferably the control is responsive to motor output speed and reduces motor displacement as speed increases.

14 Claims, 8 Drawing Figures

VARIABLE DISPLACEMENT HYDRAULIC DRIVE WITH DISCONNECT

TECHNICAL FIELD

This invention relates to a variable displacement hydraulic motor selectively used as a drive means for a vehicle. Clutch means interconnect the motor with ground engaging devices of the vehicle and the motor has a zero displacement position wherein said motor is not driven. Control means are provided to cause said motor to go to such zero displacement position when the clutch is disengaged.

BACKGROUND ART

It is well known to construct a vehicle having a plurality of groung engaging means which are utilized to drive the vehicle, some of the ground engaging means being driven at all times while other ground engaging devices being selectively driven. As an example, such a vehicle could be a tractor, a combine or a loader having four wheels, with two wheels being driven at all times while two other wheels are selectively driven only in a low speed or work range. It is furthermore known to utilize a variable displacement hydraulic transmission for the auxiliary drive.

It is desirable that when the auxiliary drive means are not being utilized, that such drive means are disengaged from the ground engaging wheels. Malm et al, U.S. Pat. No. 3,458,005 and Jennings et al, U.S. Pat. No. 3,736,732 teaches an auxiliary hydrostatic drive for the front wheels of a vehicle. A fixed displacement hydraulic motor is connected to the drive wheels by means of a fluid operated clutch. The fluid operated clutch is engaged by the fluid pressure in the hydraulic lines between the pump and the motor. Furthermore, these references teache an electric operated valve connected to the primary transmission to prevent flow in the hydrostatic drive during a high speed mode of operation.

DISCLOSURE OF THE INVENTION

The primary feature of the invention disclosed herein is to provide a drive for a vehicle by means of a variable displacement hydraulic motor and selectively engagable clutch means. The hydraulic motor, when such clutch means are disengaged, is placed in a zero displacement position whereby the motor is not driven. Control means are provided to selectively place the hydraulic motor is in the zero displacement position and move the clutch means to a disengaged position.

Since the drive of the present invention utilizes a variable displacement motor, the use of a zero displacement position of the motor to prevent hydraulic drive thereof allows the use of control means already associated with that motor. Furthermore, in a preferred form, the fluid engageable clutch is disengaged when a motor over speed condition exists without requiring separate operator control. Even in the simplest form, separate valve means in the high pressure line between the motor and its pump driving means are not required by the embodiments of the present invention.

While both manual and electrical controls for the present invention are contemplated, in the preferred form the control is hydraulic and utilizes the standard hydraulic servo control normally associated with variable displacement hydraulic units to bring the hydraulic motor to the zero displacement condition when the drive is not desired. Since hydraulic control of the displacement of the motor is utilized in the preferred form, a fluid engageable clutch is also contemplated to simplify the control. When such a hydraulic control is utilized, the source of fluid pressure for both the clutch and the servo control can be the primary pressure line which drives the motor.

It is also an objective of the present invention, in the preferred form, to utilize an auxiliary drive of higher numerical ratio than the primary drive of the vehicle since the auxiliary drive is only used in a work range which is a low speed application. Since the auxiliary drive is only intended for use during such a low speed, an over-speed condition may cause damage to the hydraulic motor. Thus, the preferred form of the control system is sentative to the speed of rotation of the auxiliary drive motor. Preferably, this speed sensitive control comprises a pump driven by the auxiliary motor which modulates a plurality of fluid control elements to selectively operate the fluid servo mechanism and the fluid clutch. Thus, accidental downshift from high speed two wheel drive operation to low speed four wheel drive operation is prevented when the movement of the vehicle is above a given speed due to down hill travel or high speed drive.

Another object of the present invention is to utilize the primary fluid pressure in the pump/motor system as the control fluid for the servo control and the clutch. Such control pressure is modulated by a pressure reducing valve which is responsive to both the primary fluid pressure and to an auxiliary pressure proportional to the speed of the auxiliary motor.

Thus, a primary object of the present invention is to provide a positive displacement fluid drive transmission system for a vehicle having ground engaging means and including a prime mover, pump driven by the prime mover, a variable displacement fluid motor, displacement control operatively controllingly coupled to the motor, fluid passageways interconnecting the motor to the pump in driving relationship, a clutch drivingly connecting the motor to said ground engaging means, the clutch having an engaged position and a disengaged position, said transmission system characterized by the displacement control for the motor having a zero displacement position to preclude the motor from being driven by the pump, and a multi-position control controllingly coupled to both the clutch and the displacement control for the motor, the multi-position control having a first position wherein the clutch is in the engaged position and the motor is driven and a second position wherein the clutch is in the disengaged position and the motor displacement control is in the zero displacement position.

Yet another object of the present invention is to provide a positive displacement fluid drive transmission system for a vehicle having ground engaging means, an engine, a pump driven by the engine, a variable displacement motor, a fluid passageway drivingly connecting the motor with the pump, a fluid controlled clutch having an engaged position and a disengaged position for selectively drivingly connecting the motor to the ground engaging means, a fluid operated servo control for varying the displacement of the motor from a maximum displacement position to a zero displacement position, the servo control including an expandable chamber operatively connected to said motor to decrease the displacement thereof when the chamber is subjected to fluid pressure, a fluid control to selectively operate the clutch and the servo control, the fluid control including a source of fluid flow, a drain, a control fluid line connecting the source of fluid flow with the clutch and with the servo control, a first valve in the control fluid line for modulating flow therethrough, the first valve having a first position permitting fluid flow through the control fluid line and a second position blocking fluid flow through the control fluid line, a speed signal means operatively connected to the motor to produce a signal proportional to the speed of the motor, a speed signal line between the speed signal means and the first valve to bias the first valve from its second position toward its firstd position upon an increase in motor speed, a second valve in the control fluid line and biased by pressure in said control fluid line to move the second valve from a first position blocking flow from the control fluid line to the expandable chamber toward a second position connecting the control fluid line to the expandable chamber to decrease the displacement of the motor.

An additional object of the present invention is to provide a positive displacement fluid drive transmission system for a vehicle having a primary drive ground engaging means and an auxiliary drive ground engaging means, said vehicle having an engine, a pump driven by said engine, first variable displacement motor driven by said pump and drivingly connected to said primary drive, second variable displacement motor driven by said pump, a fluid operated clutch having an engaged position and a disengaged position, the fluid operated clutch selectively drivingly connecting the second motor to the auxiliary drive a first fluid operated servo control for varying the displacement of the first motor, a second fluid operated servo control for varying the displacement of the second motor, and a fluid control to selectively operate the clutch and the first and second servo controls, said fluid control including a source of flow, a clutch valve for modulating the flow of fluid from the source to the clutch, a first shift valve for modulating the flow of fluid from the source to the first servo control, a second shift valve for modulating the flow of fluid from said source to said second servo control, the fluid control means having a low range position and a high range position, the fluid control when in the high range position positioning the first shift valve to increase the flow of fluid from the source to the first servo control in a manner to increase the displacement of the first motor and positioning the second shift valve to increase the flow of fluid from the source to the second servo control in a manner to decrease the displacement of the first motor while biasing the clutch valve toward a position to reduce the flow of fluid to the fluid operated clutch.

BEST MODE FOR CARRYING OUT THE INVENTION

Figure 1:
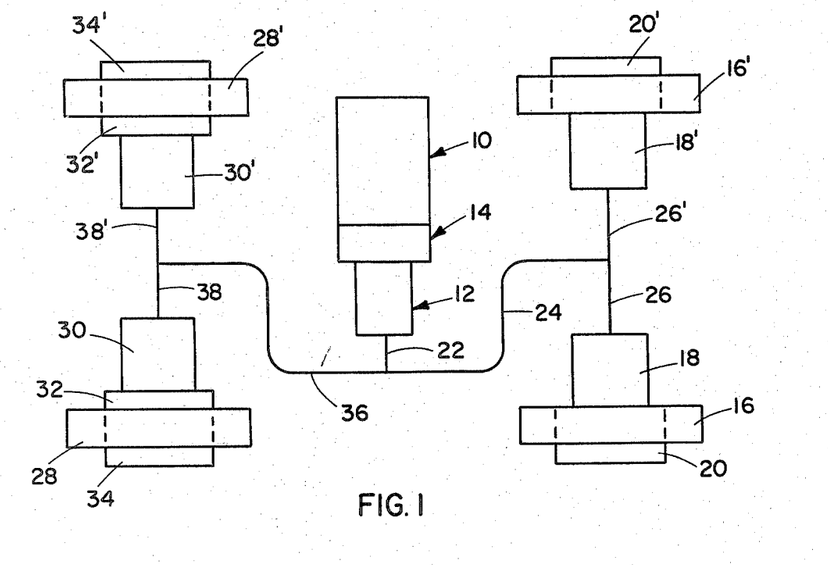
FIG. 1 is a schematic diagram of a four wheel drive vehicle utilizing the present invention.

Reference is now made to FIG. 1 which schematically depicts a vehicle utilizing the drive of the present invention. The vehicle is provided with a prime mover or an engine 10 which drives a pump 12 through a gear box 14. The pump 12 provides a source of fluid flow and pressure for a hydraulic drive for the vehicle and need not be of any particular type. However, in the preferred form contemplated, the pump is a variable displacement reversible pump of the swash plate type commonly utilized in hydrostatic and hydromechanical drives. As is well known in the art, a variable displacement pump may be controlled in such a manner to provide a transmission ratio which allows the engine 10 to be operated in a particular manner to obtain an overall desired effect such as minimum fuel consumption.

The vehicle is furthermore provided with a primary drive system comprising wheels 16 and 16' driven by variable displacement motors 18 and 18' through gear boxes 20 and 20'. The variable displacement motors 18 and 18' are of the positive displacement type, the displacement thereof being controlled by swash plates to be described later in conjunction with FIGS. 2 and 3. The motors 18 and 18' are driven by pump 12 through fluid lines 22, 24, 26 and 26' schematically represented.

The vehicle is also provided with selectively engaged auxiliary drive means represented by wheels 28 and 28' driven by variable displacement motors 30 and 30' through clutches 32 and 32' and gear boxes 34 and 34' respectively. The motors 30 and 30' are also driven by the pump 12 through lines 22, 36, 38 and 38' schematically represented.

The hydrostatic transmission may be of either the open circuit or the closed circuit system both well known in the art. In the closed circuit system, each of the lines mentioned above would represent a pair of lines in the normal manner.

Figure 2:
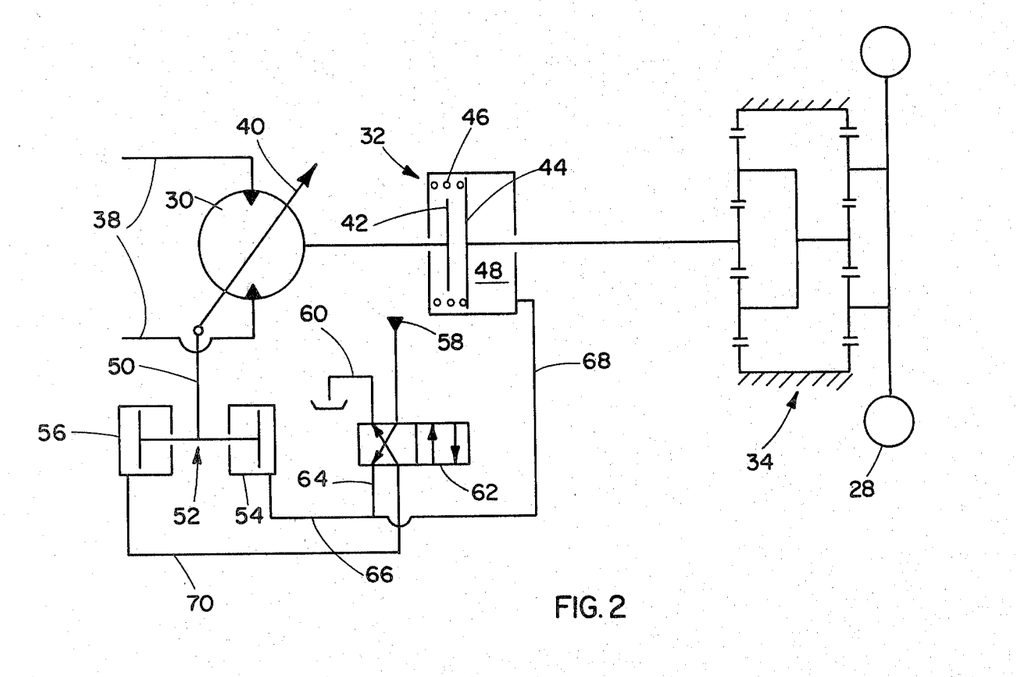
FIG. 2 is a schematic diagram showing a control and drive for one auxiliary drive wheel of the vehicle of FIG. 1.

FIG. 2 schematically represents the drive of one of the auxiliary drive wheels 28 and 28' of FIG. 1, with only the drive to wheel 28 being shown. The wheel 28 as explained above, is driven by the variable displacement hydraulic motor 30 through clutch 32 and a gear box 34 which is represented as a dual planetary gear set. FIG. 2 shows a simplified fluid control for both the variable displacement motor 30 and the clutch 32. The motor 30 is provided with a swash plate 40, the position of which establishes the stroke of axially movable pistons (not shown) and thus the displacement of the motor as per the standard variable displacement hydrostatic drive motor.

The control of FIG. 2 is a simplified hydraulic control for both the swash plate 40 of the motor 30 and also the clutch 32. It is, however, comtemplated that either a mechanical control or an electrical control could be utilized as long as that control operates both the clutch 32 and the swash plate 40 in the manner to be described.

The fluid operated clutch 32 is provided with a first member 42 driven by the motor 30. The clutch is also provided with a second member 44, connected to the gearbox 34, and normally biased away from the clutch member 42 by means of spring 46. In such position, the clutch 32 is disengaged. Movement of member 44 against spring 46 causes engagement with the driven member 42 to drive the planetary gear set 34 and thus the wheel 28. Thus movement of member 44 against the spring 46 moves the clutch to an engaged position. The clutch 32 is furthermore provided with a fluid chamber 48 which, when subjected to fluid pressure, causes movement of member 44 toward member 42 to cause clutch engagement.

In the fluid control system of FIG. 2 the swash plate 40 of motor 30 is connected by means of linkage 50 to a servo control mechanism 52. The servo control 52 comprises a first expandable chamber device 54 and a second expandable chamber device 56. As is common in servo controls for variable displacement units, the expandable chamber devices 54 and 56 are piston-cylinder arrangements. Fluid flow to the expandable chamber 54 causes movement to the left of the linkage 50 which increases the displacement of the motor 30 by movement of the swash plate 40 in a clockwise direction. Fluid flow to the expandable chamber device 56 decreases the displacement of the motor 30 by movement of the linkage 50 toward the right and thus movement of the swash plate in a counterclockwise direction as shown in FIG. 2. In the variable displacement motors of the drive of the present invention, the swash plate 40 may be moved by the expandable chamber device 56 to a zero displacement position. When the swash plate 40 is in the zero displacement position the pistons of the motor 30 have no stroke and thus are not driven by fluid flow through lines 38 from the pump 12 shown in FIG. 1. The motor 30 of FIG. 2 is contemplated to be in a closed loop system and capable of reverse drive, thus the single line 38 of FIG. 1 is shown as a pair of lines 38 in FIG. 2 as explained above.

The fluid control of FIG. 2 is provided with a source of pressure represented as 58 and a drain 60. A switching valve 62, when in its right hand position shown in FIG. 2, permits the flow of fluid from the source 58 through lines 64 and 66 to the first expandable chamber device 54, and at the same time permits flow through line 64 and 68 to the clutch chamber 48. This flow of fluid biases the swash plate 40 toward its maximum displacement position through the first expandable chamber device 54 and at the same time biases the second clutch member 44 toward an engaged position against the spring 46. When the valve is in this first position, the second expandable chamber device 56 of the servo control 52 is connected to drain 60 by way of line 70.

When the valve 62 is moved to its left hand position, opposite that shown in FIG. 2, the fluid flow reverses. In this position of the valve 62, the flow of fluid is from the source 58 through line 70 to the second expandable chamber device 56 to move the swash plate 40 counterclockwise to its zero displacement position, wherein the motor 30 ceases to be driven. At the same time, the first expandable chamber device 54 is in communication with the drain 60 through the valve 62. Furthermore, the clutch 32 is now also in fluid communication with the drain 60 through line 68 and the valve 62.

Thus, it can be seen that when the valve is in the first position, both the clutch 32 is engaged and the swash plate 40 is moved toward its maximum displacement position. When the valve 62 is moved to its second position, the clutch 32 is disengaged and the swash plate 40 is moved to its zero displacement position to preclude drive of the motor 30.

The valve 62 operates the fluid control of FIG. 2 in a manner to assure simultaneous operation of the clutch 32 with movement of the swash plate 40. The valve 62 may be operated in any known manner such as electrically, mechanically or hydraulically.

While the control of FIG. 2 is contemplated for use as an auxiliary drive in a four wheel drive vehicle such as shown in FIG. 1, the drive may also be used as the primary drive of a vehicle. It is particularly advantageous however to utilize such a drive in the vehicle of FIG. 1 when the gear boxes 20 and 20' of the primary drive are of lower numerical ratio than the gear boxes 34 and 34' of the auxiliary drive. In such configuration, all four wheels are driven in a work range or low speed drive of the vehicle, and only the primary drive wheels 16 and 16' are driven at a high speed range. Even if all four motors 18, 18', 30 and 30' are of identical type, when the vehicle is in four wheel drive, the auxiliary motors 30 and 30' are driven at a higher speed than the rear motors 18 and 18' due to the difference in gear ratios. This tends to be self-compensating since the higher speed drive of the motors 30 and 30' reduces their torque output, there is higher torque multiplication by the higher numerical gear ratios of the gear boxes 34 and 34'. For an identical maximum speed for the different motor units, the primary drive motors 18 and 18' can be utilized to drive the vehicle at a higher speed than the auxiliary drive motors due to the lower gear ratio of gear boxes 20 and 20'.

As is well known in the hydrostatic transmission field, the motors can be driven hydraulically by the pump unit 12, but also can be driven through the wheels at which time the motors act as pumps. When the vehicle is driven by the primary drive means in a high speed range, the motors 30 and 30' could be damaged due to an over-speed condition through drive from the wheels 28 and 28'. Thus, in the high speed range, the motors 30 and 30' are disconnected from the wheels 28 and 28' by means of the clutches 32 an 32'. With the clutches disengaged, the motors 30 and 30' are unloaded and could be driven to an over speed condition by the pump 12 is not destroked. With the present invention, when the clutch means 32 is disengaged, there is no drive of the motor 30 by means of the wheel 28, but at the same time, the swash plate 40 is in a zero displacement position. In such swash plate position, the motors 30 and 30' are destroked, and there is no fluid drive thereof. Thus the motors go to zero RPM. This has the further advantage of reducing fluid losses in the drive of motor 30 and 30' and the part of the fluid flow normally used to drive the motor 30 can be applied to the primary drive motors 18 and 18'.

It is further contemplated that in a vehicle which has one end heavier than the other, the auxiliary drive is located at the heavier end of the vehicle. Thus in a loader where the weight bias tends to be near the front, the auxiliary drive is at the front of the vehicle. The same would be true for a combine. This gives the further advantage of utilizing the high gear ratio of the auxiliary drive at the heavy end of the vehicle in the normal work range or low speed drive.

Figure 3:
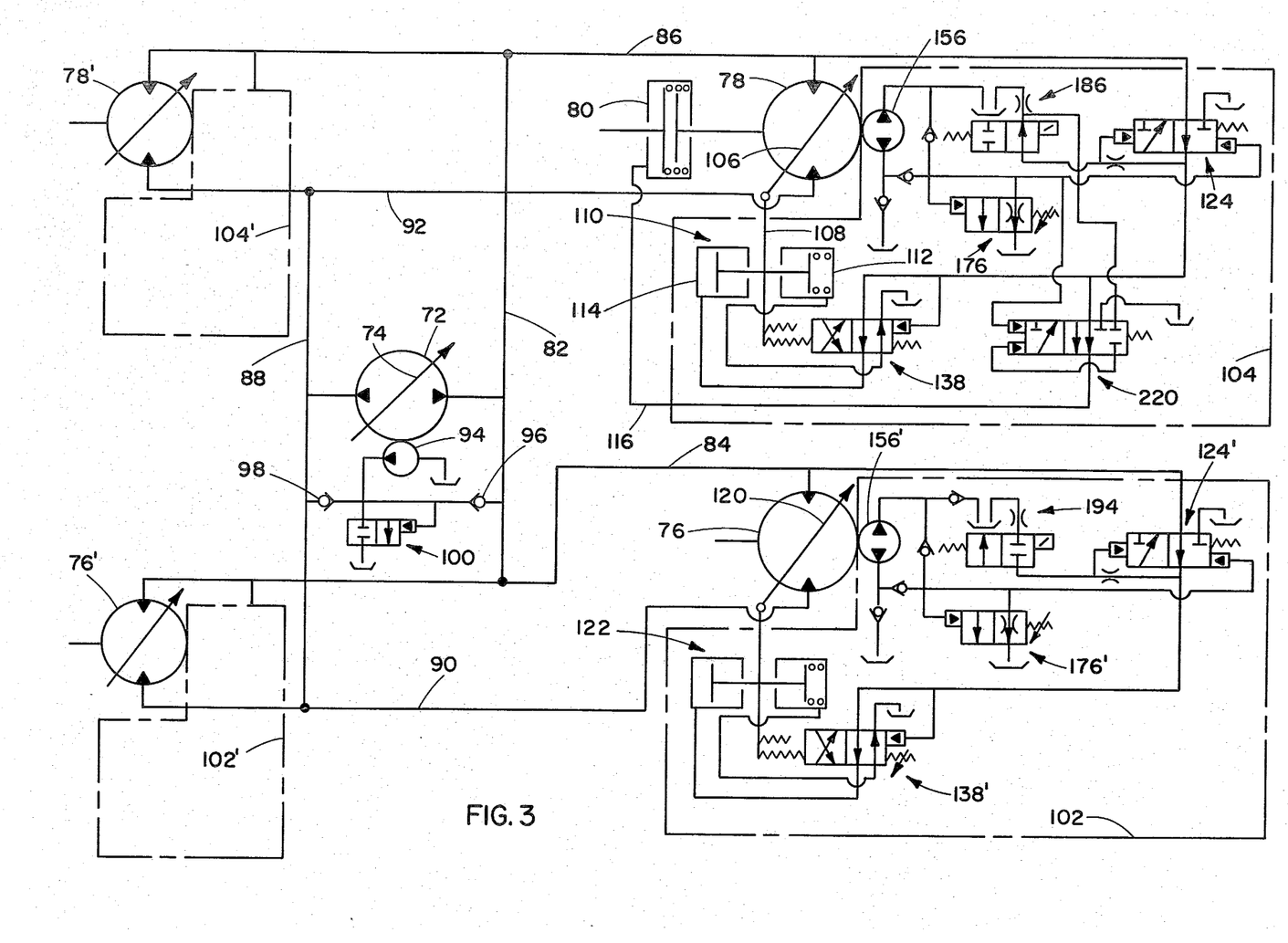
FIG. 3 is a schematic diagram showing another embodiment of the fluid control for the vehicle of FIG. 1.

A more advanced embodiment of the present invention is taught in FIG. 3 which is a schematic diagram of a control for a four wheel drive vehicle. The vehicle is provided with a variable displacement pump 72 driven by a engine (not shown). The displacement of the pump 72 is controlled by swash plate 74. The pump 72 is utilized to drive four identical variable displacement fluid motors connected in parallel. The motors 76 and 76' drive wheels (not shown) to provide a primary drive. The auxiliary drive motors 78 and 78' drive wheels (not shown) through clutch means such as 80. One side of the pump 72 is in fluid communication with the motors through lines 82, 84 and 86. The opposite side of the pump 72 is in fluid communication with the opposite side of the motors through lines 88, 90 and 92, thus forming a closed circuit whereby there is flow during operation in both directions between the pump and the motors. As is common in hydrostatic transmissions, a charge pump 94 is connected to a source of fluid to supply make-up fluid through one of a pair of check valves 96 and 98 to the fluid lines 82 and 88, whichever is at the lower pressure. The charge pressure of the pump 94 is limited by the standard pressure relief valve, generally indicated at 100.

The motors 76 and 76' of the primary drive are provided with identical controls generally indicated as boxes 102 and 102', only one of the controls being shown in detail. The motors 78 and 78' of the auxiliary drive are also provided with identical controls generally indicated as boxes 104 and 104', the control 104 only being shown in detail. The control 104 of FIG. 4 is identical to that of FIG. 3 but in larger scale.

Figure 4:
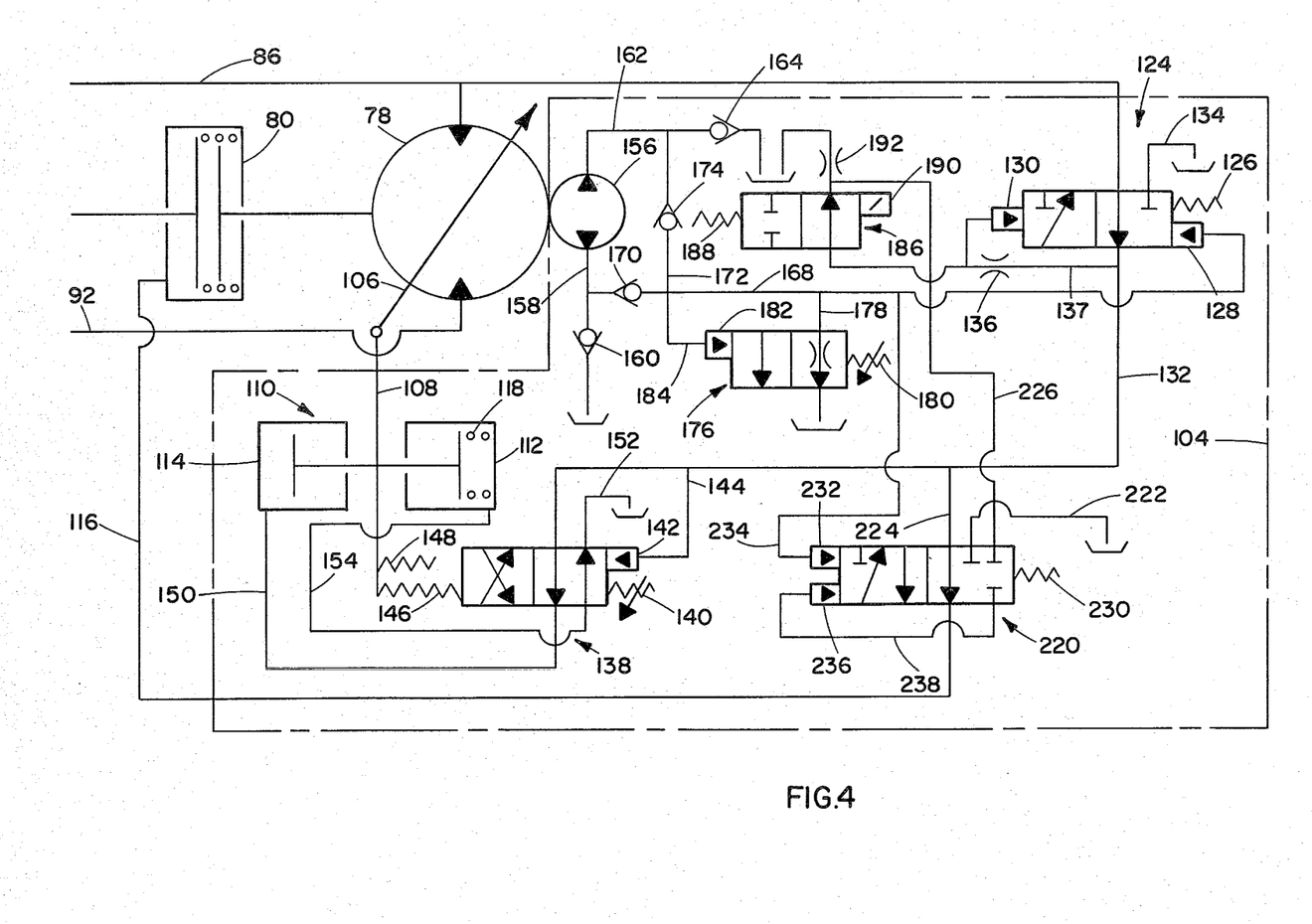
FIG. 4 is an enlarged schematic diagram of the control portion 104 of the diagram of FIG. 3.

The motor 78 of FIG. 3 and FIG. 4 has the same basic controls as the variable displacement motor 30 shown in FIG. 2. The motor 78 is provided with a swash plate 106 connected by a linkage 108 to a servo control 110. The servo control is provided with a first expandable chamber device 112 which when subjected to fluid pressure moves the swash plate 106, by means of linkage 108, clockwise toward a maximum displacement position. A second expandable chamber device 114 is provided which when subjected to fluid pressure moves the swash plate 106 counterclockwise towards the zero displacement position.

The variable displacement motor 76 of the primary drive is also provided with a swash plate 120 and a servo control 122 having two expandable chamber devices. Thus the displacement control for the motor 76 operates in the same manner as the displacement control for the motor 78.

The primary difference between the servo controls 110 and 122 of FIG. 1 and the servo control 52 of FIG. 2 is that the servos 110 and 122 are provided with springs such as spring 118 (shown in FIG. 4) in the expandable chamber device 112 to bias the swash plates 106 and 120 toward the maximum displacement position when there is no fluid bias on the servo mechanisms.

Other than the spring bias, the servo controls 110 and 122 work in a similar fashion to the servo control 52 of the motor shown in FIG. 2 and described above. The fluid clutch 80 of FIG. 3 is like clutch 32 of FIG. 2 and works in similar fashion when subjected to fluid pressure through a line 116.

Turning ones attention to the enlarged schematic diagram of the control 104 in FIG. 4, the detail of the hydraulic control for the variable displacement motor 78 can be seen. The hydraulic flow in pressure in the line 86 from the pump 72. (FIG. 3) is modulatingly controlled by a pressure reducing valve 124. The pressure reducing valve is biased toward the left by spring 126 and pressure in a pilot 128 and is biased toward the right by a pressure in a pilot 130. The pressure reducing valve 124, when in the left hand position shown in FIG. 4, permits flow from line 86 to a line 132, but when in the right hand position connects the line 132 to a drain 134. The pilot 130 is connected to the line 132 through a line 137 having a restriction 136 and thus the force on the valve 124, tending to move it toward the right, is proportional to the pressure in line 132. This modulates the flow through the pressure reducing valve 124 so that the line 132 is not subjected to extremely high pressure in line 86.

A displacement control valve 138 is placed in line 132 to modulatingly control the flow through line 132 to the servo control 110. The valve 138 is biased to the left by a pre-set adjustable spring 140 and by pressure in a pilot 142 connected to line 132 by line 144. The valve 138 is biased toward the right by spring 146 positioned between the valve 138 and the linkage 108 of the displacement servo control 110. Thus the valve 138 is responsive to the position of the swash plate 106. A preloaded spring 148 is also provided which is only engaged by the linkage 108 after a certain range of movement of the swash plate 106 in a counterclockwise direction toward the zero displacement position. The preloaded spring 148 provides a dwell in the movement of the linkage 108 and thus a dwell on the decreasing displacement movement of the swash plate 106.

The displacement control valve 138 is therefore modulated by the counterbalanced forces of the springs 148 and 146 and the line 132 pressure at pilot 142. When the valve 138 is in the right hand position (opposite that shown in FIG. 4) flow from line 132 is provided to the first expandable chamber 112 of the servo control 110 through the valve 138 and line 154 to cause an increase in the displacement of the motor 78. This fluid bias is in addition to the initial bias of spring 118. At the same time the second expandable chamber 114 of the servo control 110 is connected to a drain 152 through the valve 138 and a line 150.

As pressure in line 132, and thus at pilot 142, increases, the valve 138 is biased toward the left, as shown in FIG. 4, which tends to reverse the flow from line 132 through the valve 138. Thus, the pressure in line 132 is directed to the second expandable chamber 114 to bias the linkage 108 to the right against the bias of spring 118. The swash plate 106 now moves in a counterclockwise direction toward minimum or zero displacement. At the same time, the first expandable chamber 112 is now connected to the drain 152 through the line 154 and valve 138. Such right hand movement of the linkage 108 further compresses the spring 146 which counteracts the pressure in the pilot 142 and thus modulates the valve 138.

A further input to the hydraulic control 104 is provided by a pump 156 connected to the motor 78 to be driven thereby. The pump 156 has an output proportional to the speed at which it is driven. Thus, the pump 156 provides a variable speed signal indicative of the motor speed regardless of whether the motor 78 is driven in the normal manner by the variable displacement pump 72 or by means of the wheel selectively connected thereto by means of clutch 80. The speed signal pump 156 is connected to drain by a first line 158 having a check valve 160 and by a second line 162, having a check valve 164, on the opposite side of the pump. The speed signal pump 156 is thus provided with a source of fluid regardless of the direction of rotation thereof due to the reversal of direction of rotation of motor 78. Line 158 is connected to a speed signal line 168 by means of a check valve 170 which works in an opposite direction to that of the check valve 160. Line 162 is also connected to speed signal line 168 by means of a line 172 having a check valve 174 which works in a direction opposite to that of check valve 164. Thus, line 168 is always provided with positive pressure proportional to the speed of rotation of the motor 78 regardless of the direction of rotation thereof.

The speed signal in line 168 is applied to the pressure reducing valve 124 through the pilot 128 mentioned above. Therefore, as the speed of motor 78 increases, the higher pressure provided by pump 156 and line 168 tends to move the pressure regulator valve 124 toward the left causing a valve 124 modulation against the pressure at pilot left hand 130, this increases the pressure in line 132. As mentioned above, increased pressure in line 132 tends to move the displacement control valve 138 to the left due to pilot 142 and thus increase flow to the second expandable chamber 114 to destroke the variable displacement motor 78. Therefor an increase in speed of motor 78 increases the bias toward a destroked position.

The speed signal in line 168 is further conditioned by a signal conditioner valve 176. The valve 176 modulates the flow from the speed signal line 168 to drain through a line 178. The valve 176 is biased to the left by an adjustable spring 180 and biased toward the right by pressure in a pilot 182 connected to a speed signal line 168 by a line 184. The signal conditioner valve 176 when in the left hand position shown, provides a restriction of flow through the line 178. When the valve 176 is biased toward the right hand position by the pressure in pilot 182, a larger flow is allowed to drain through the speed signal line 168. Thus, the signal conditioner valve 176 is modulated by the pressure is speed signal line 168 which is proportional to the speed of the motor 78.

The control elements so far described in the hydraulic control 104 for the variable displacement motor 168 of the auxiliary drive are provided in the same manner with the same function for the variable displacement motor 76 of the primary drive. Thus the control 102 is provided with a pressure regulating valve 124', a displacement control valve 138', a speed signal pump 156' and a signal conditioner valve 176', all shown in FIG. 3.

The hydraulic control for the motor 78 in the auxiliary drive is further provided with a solenoid operated shift valve 186. The valve 186 is biased to the right blocking position by spring 188 and may be selectively moved to the left flow position by solenoid 190 at vehicle operator command. When the valve 186 is biased to the right by this spring 188, pressure is maintained in line 137 and thus in the pilot 130 tending to bias the pressure relief valve 124 toward the right. This reduces the flow through the valve 124 and thus the pressure in line 132 and pilot 142 of the displacement control valve 138. With the pressure reduced at pilot 142, the spring 146 tends to bias the displacement control valve 138 toward the right and thus increase flow therethrough to the first expandable chamber 112 to increase the displacement of the motor 78. When high speed vehicle operation is desired, the solenoid 190 is operator activated to move the shift valve 186 to the left and flow in line 137 behind the restriction 136 is permitted to drain through a restriction 192. This relieves the pressure at pilot 130 allowing pressure reducing valve 124 it to shift toward one left due to the influence of spring 126 and pilot 128. This increases the pressure in line 132 and thus the pilot 142 causing the displacement control valve 138 to move toward the left. This permits flow from line 132 through the valve 138 to the second expandable chamber 114 of the servo control 110 to move the swash plate 106 counterclock- wise to a zero displacement position. This prevents further fluid drive of the motor 78.

The hydraulic control 102 of the motor 76 of the primary drive is also provided with a solenoid operated shift valve 194 which is similar to the shift valve 186 described above but which operates in the opposite manner. Thus the shift valve 194 is normally spring biased to an open flow position to reduce the left hand bias on the pressure reducing valve 124' to allow greater flow to the displacement control valve 138' and is right hand pilot. This permits flow to the servo control 122 biasing the swash plate 120 toward a reduced displacement position. When high speed operation is desired, the solenoid of the valve 194 is activated (along with solenoid 190 mentioned above), the valve 194 is biased to a closed position increasing the left hand bias on the pressure reducing valve 124' and thus reducing flow to the displacement control valve 138' and its pilot to increase the displacement of the primary drive motor 76.

Figure 5:
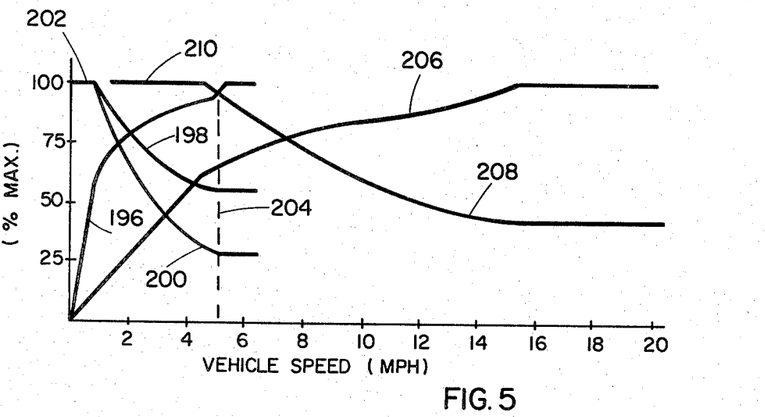
FIG. 5 is a graph comparing hydraulic unit placement vs. vehicle speed.

The purpose for the reversal in operation of the shift valve 186 of the auxiliary drive and the shift valve 194 of the primary drive can be ascertained from a study of the graph of FIG. 5. This graph compares the hydraulic unit displacement of the pump 74 and the motor 76 and 78 vs. vehicle speed for a vehicle utilizing a control system similar to that taught in FIG. 3. When the vehicle is in the low speed or in the work range, the solenoids for the valves 186 and 194 are not energized and thus the motor 78 of the auxiliary drive tends to be biased toward an increased displacement position while the motor 76 tends to be biased toward a decreased displacement position (as explained above). Line 196 represents the relative displacement of the pump during low range operation while lines 198 and 200 represent the relative displacement of the motor displacement for motors 76 and 78 respectively.

At the beginning of low speed drive, when the vehicle is at zero speed, the pump is at zero displacement and the two motors 76 and 78 are at maximum or 100% displacement represented by the short horizontal line 202. To increase vehicle speed and thus drive the vehicle, the displacement of the pump 72 is increased as represented by line 196. During the first part of the drive, the motors remain at 100% displacement due to the bias of spring 118 on the servo control linkage. As pump displacement increases, the increased flow through the pressure regulating valve 124 and thus the line 132 increases the right hand bias on the pilot 192 to displacement control valve 138 to increase the left hand bias on the servo control 110 to overcome the force of spring 118 moving the swash plate 106 counterclockwise. A similar effect occurs in the control 102 for the motor 76. Thus, as seen in FIG. 5 the curves 198 and 200 representing the displacements of the motor 76 and 78 decrease as speed increases. Since the gear ratio for the primary drive is numerically lower than the auxiliary drive, the speed of motor 78 must be higher than the speed of motor 76 for equal wheel speed. Therefore, the springs for the valves 176 and 180 are of a different spring rate than the spring for valves 176' and 180'. The variable or modulated orifice of signal conditioner valve 176 is also designed of different size than the orifice in valve 176' to take into effect the different gear ratios.

The displacement of the motors 76 and 78 continues to decrease until a normal maximum speed condition is reached. The respective displacement control valves 138 and 138' have been biased to the right due to the pressure applied thereon by the swash plate linkages through springs such as 146. Once normal maximum speed or normal minimum swash plate position has been obtained (represented by the vertical dotted line 204 in FIG. 5), the swash plate linkage 108 abuts the preload spring 148 to prevent further movement of the linkage 108 to the right. The preload of spring 148 for motor 78 is less than the preload for motor 76, thus allowing a lower normal minimum displacement position for motor 78. Until the forces of the preload springs are overcome, further decreased displacement of the motors is prevented as represented by the horizontal portion of the lines 198 and 200 after normal maximum speed has been reached.

As is well known in the variable displacement motor art, as motor displacement is reduced thus decreasing the stroke of the pistons in the hydraulic unit, motor speed is increased for a given flow. Since as motor displacement decreases, the motor speed is increased for a given flow, the displacement of the pump 72 increases at a lesser rate for a given increase in speed once motor displacement starts to decrease. This is seen by the mid portion of line 196 in FIG. 5.

When the hydraulic transmission system is put into a high speed mode by the operator activation of the solenoid shift valves 186 and 194, the hydraulic unit displacements as represented by lines 206 and 208 of FIG. 5 are provided. Shift valve 186 is now biased toward its left hand position (shown in FIG. 4) allowing flow therethrough to drain. This reduces the pressure on pilot 130 of the pressure reducing valve 124, thus providing a further bias toward the left which allows more flow to line 132 and thus to pilot 142 of the displacement control valve 138 moving this valve further toward the left. The increased flow through the displacement valve 138 to the second expandable chamber device 114 causes the swash plate 106 to move counterclockwise to a zero displacement position at the same time that the first expandable device 112 is connected to drain through line 154 and the valve 138. Thus, the displacement of the motor 78 in the high speed range is zero and thus not shown in FIG. 5.

Since the valve 194 in the high speed range is now in a blocked flow position, there is an increase in pressure biasing the pressure reducing valve 124' to the right. This reduces the flow to the displacement control 138' and the pressure on its right hand pilot. Thus the valve 138' moves to the right increasing the flow to the right hand chamber of the servo control 122. The left hand chamber is connected to drain thus the servo control 122 moves the swash plate 120 clockwise to increase the displacement of the motor 76. In high speed range, the shift in hydraulic control flow for motor 76 tends to aid the spring of the servo control mechanism 122 rather than oppose the force of the spring. Therefore, the displacement of motor 76 stays at 100% or maximum position for a longer period of time as represented by the line 210 in FIG. 5. As speed builds up, the output of pump 156' (shown by line 206) again provides a right hand bias on the pressure reducing valve 124 to increase flow to the displacement control 138'. This increased flow biases the servo control 122 to the right to again decrease the displacement of the motor 76 as shown by the curved portion of line 208 in FIG. 5. As speed of the vehicle continues to build, the motor unit 76 will again reach its normal maximum displacement position and the pump 72 will reach 100% maximum displacement at which point further displacement change ceases. The vehicle may continue to increase speed by an increase in vehicle prime mover speed thus driving the pump 72 at a higher RPM.

Figure 7:
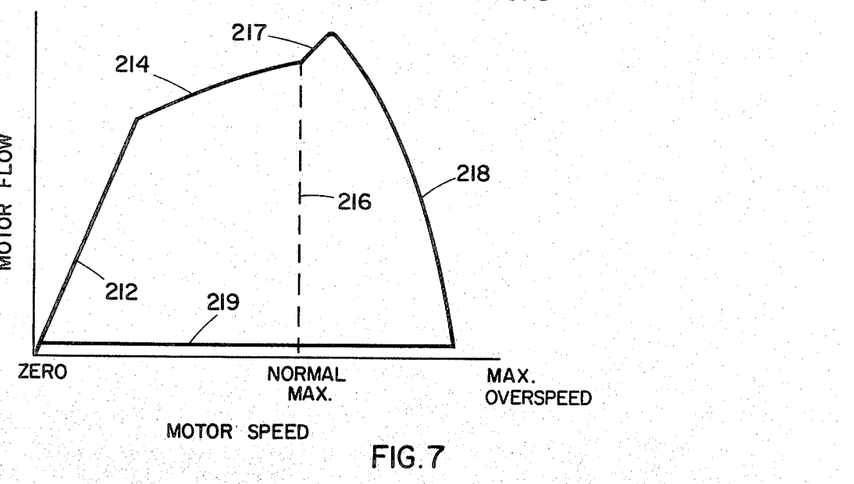
FIG. 7 is a graph comparing motor fluid flow vs. vehicle speed.
Figure 8:
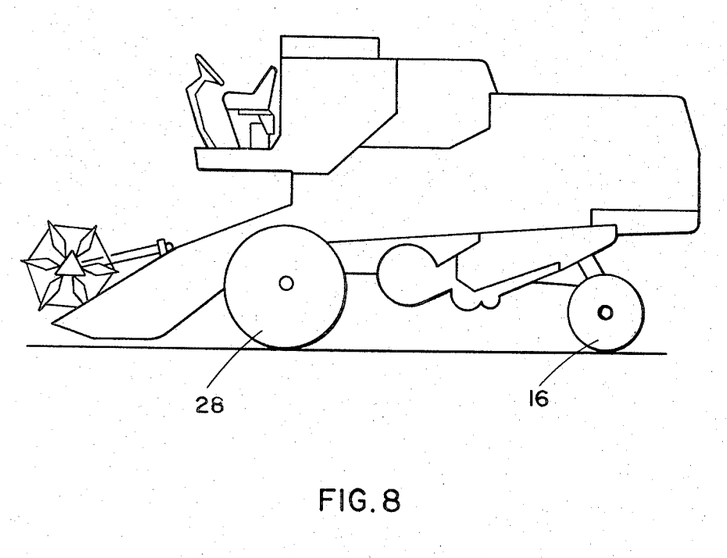
FIG. 8 is a side view of a vehicle utilizing the drive of the present invention.

FIG. 7 shows a comparison of motor flow to motor speed. At zero motor speed, there is no flow to the motor and the motor is in the maximum displacement position as represented by line 202 of FIG. 5. As pump 72 displacement increases, there is an increased flow to the motor which increases the speed thereof in a direct linear relationship as represented by line 212. Once there is sufficient flow to overcome the pressure of the servo control spring such as 118, the displacement of the motor decreases as explained with respect to FIG. 5. As displacement and thus stroke of the motor decreases, a unit increase in flow causes the speed of the motor to increase at an even faster rate as seen by the curved portion 214 in the graph of FIG. 7. This continues until the motor reaches its normal maximum speed or normal minimum displacement position as maintained by the spring 148 for the motor 78. At a point beyond the normal maximum motor speed, represented by line 216, the motor flow increases linearly, as at 217, due to the dwell caused by spring 148 and then drops off as indicated by line 218 and eventually drops to zero as the motor reaches zero displacement. At this point the motor is no longer driven by fluid flow since there is no stroke of the motor at zero and the motor speed drops to zero. Zero displacement prevents drive of the auxiliary drive motor 78 during high speed range operation. This is caused by the selective operation of the solenoid shift valve 186 as described above. When the shift valve 186 is actuated, motor speed drops to zero as indicated by line 219.

The zero displacement position of the motor as referred to above, and in the claims attached hereto, refers to that displacement position where fluid flow to the motor provides no torque or zero torque output of the motor. This occurs when the motor swashplate or displacement is actually at zero or near thereto. In real practice this is when displacement is between zero degrees and approximately two degrees or within the first 10% of the total or maximum displacement for the motor. At this point there is substantially zero output torque and the fluid flow drive to the motor is prevented. Thus the motor speed falls to zero, as seen by line 219 in FIG. 7, if the clutch is disengaged so the motor is not driven by the wheels.

Even though the motor 78 is no longer driven by the pump 72, the motor 78 would normally continue to rotate due to its connection to the ground engaging wheel. Since the motor 78 has a higher numerical ratio gear train than motor 76, it rotates at a higher RPM than the primary drive motor 76 when both are engaged to their respective wheels and the wheels are rotating at the same RPM. When the hydrostatic transmission of FIG. 3 is in high range operation the motor 76 and 76' move the vehicle at a speed represented by line 208 in FIG. 5. In this high speed range operation, it is necessary to declutch the motor 78 from its wheel to prevent an over speed operation of the motor 78 by drive through the wheels.

The hydraulic control 104 is therefore provided with a clutch valve 220. The valve is connected to drain by line 222, to the pressure line 132 by line 224, and to the line 137 downstream of the shift valve 186 but upstream of the restriction 192 by line 226. The other side of the clutch valve 220 is connected to the clutch 80 by means of the line 116 to provide fluid pressure thereto for the engagement thereof. The valve 220 furthermore is biased to the left by means of a spring 230 and biased to the right by pressure signals at pilots 232 and 236. The pilot 232 is connected to the speed signal line 168 by line 234, and the other pilot 236 is connected to the valve 220 on the clutch side thereof by a line 238.

The clutch valve 220 described above is utilized to apply fluid pressure to the clutch 80 to cause engagement thereof when the auxiliary drive motor 78 is driving in the low speed mode of vehicle operation. The clutch valve 220 furthermore connects the clutch 80 to drain and thus disengages the clutch when the motor 78 is in a zero displacement position during high speed operation of the vehicle. When the clutch valve 220 is biased to its left hand position by the spring 230, there is clutch engagement flow to the clutch 80 from line 132, through line 224, clutch valve 220 and line 116. When the clutch 220 is biased toward a right hand position by pressure at pilots 232 and 236, the fluid clutch 80 is connected to drain by line 116, valve 220 and line 222. The motor speed signal in line 168 is applied to the pilot 232 via the line 234. Thus as the motor 78 increases in speed, either due to the drive from pump 72 or drive from the wheel attached thereto, the clutch valve 220 is biased toward the right due to the pressure in pilot 232. When the valve 220 is in the right hand position, the clutch line 116 is connected to the drain 222 to relieve the hydraulic pressure on the clutch 80 and cause disengagement thereof. Therefore, flow through line 224 is blocked by the valve 220 thus when an over speed condition is reached regardless of how the motor 78 is driven since the speed signal created by the pump 156 causes the clutch valve to drain the clutch 80 to disengage the motor 78 from the wheel. At the same time, due to the operation of the pressure reducing valve 124 and the displacement valve 138 described above, the motor 78 is brought to zero displacement position to prevent drive thereof. Thus the clutch 80 is held in an engaged position by flow through the valve 220 until the pump 156 is driven at a sufficient speed to provide a speed signal at pilot 232 to move the valve against the spring 230 to drain the clutch.

Furthermore, when the solenoid shift valve 186 is moved toward the left by the solenoid 190 upon an operator selected shift to the high speed range, flow from the pressure regulated valve 124 is directed to the clutch valve 220 through line 137, valve 186 and line 226. Due to the restriction 192 there is sufficient pressure in the flow through valve 186 to cause flow through line 226 to the valve 220 which is connected to line 238 and thus pilot 236. Once flow through these lines is permitted, pressure builds up in pilot 236 to bias the valve 220 against the spring 230 to continue to increase such flow through clutch valve 220. The movement to the right of valve 220 then drains the clutch 80 through lines 116 and 222 as described above.

Therefore, clutch draining movement of the clutch valve 220 toward the right is caused by flow through either the selectively solenoid operated shift valve 186 or due to an increase in pressure pilot 232 due to an increased speed signal in line 168. When an intentional shift is made by operation of the shift valve 186, the valve 220 holds itself in a clutch draining position due to pilot 236, until the shift signal is removed. If the shift signal is removed from pilot 236 while the vehicle is operating at a speed range (to the right of the dotted line 204 in FIG. 5), the valve 220 would tend to move to the left due to the influence of spring 230 and thus tend to cause the clutch 80 to engage. This however would cause drive of the motor 78 through the ground engaging wheel. Such drive would cause an increase speed signal pressure in line 168 due to the drive of the pump 156 by the motor 78. Such increased speed signal is applied to pilot 232 thus again moving the valve toward the right to disengage the clutch 80 and thus prevent over speed drive of the motor 78 and damage thereto. Therefore, the hydraulic control of 104, including the clutch valve 220, protects the motor from over speed damage during accidental downshift in the high speed range.

The adjustable spring 180 of the signal conditioning valve 176 described above is adjusted to assure sufficient pressure in speed signal line 168 in an over speed condition to operate the clutch valve 220 through pilot 232 to disengage the clutch, while preventing too high a pressure at pilot 128 of the pressure reducing valve 124 to prevent proper modulation thereof.

It is thus seen that the hydraulic control 104, while more complicated than that shown in FIG. 2, provides an automatic operation to insure that the clutch is engaged and the auxiliary motor 78 is driven when a low speed range is selected. The clutch 80 is disengaged and the motor 78 is in a zero displacement position or non-drive position when high speed operation is selected. Furthermore, the control 104 prevents over speeding of the motor 78 if an accidental downshift is caused during high speed operation.

Figure 6:
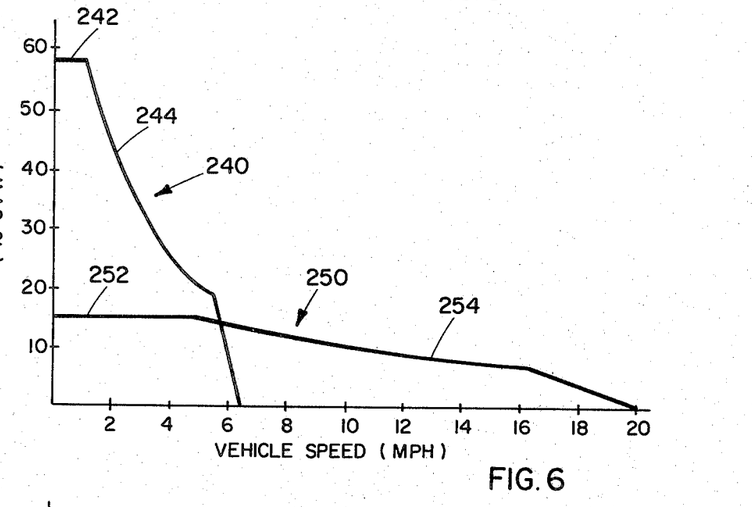
FIG. 6 is a graph comparing vehicle-tractive effort vs. vehicle speed.

FIG. 6 compares vehicle-tractive effort as compared to vehicle speed in both the low speed and high speed operation of the vehicle. The graph of FIG. 6 is representative of the tractive performance obtained on a vehicle with a hydrostatic transmission having one variable pump input and four identical variable displacement outputs of the type disclosed above. Two of the motors with controls 102 and 102' provide a primary drive to the rear wheels of the vehicle while the other two motors with controls 104 and 104' provide an auxiliary drive to the front wheels of the vehicle. As also disclosed above, the front wheel auxiliary drive has a higher gear ratio than the rear wheel primary drive. Furthermore, the heavy front end is the one provided with the higher gear ratio auxiliary drive. As can be seen from the graph, with line 240 representing the vehicle drive in low speed operation or during work range, the vehicle has an extremely high percentage tractive effort especially when the motors are at maximum displacement position as represented by part 242 of the curve 240. When the motors are in such maximum displacement position (also represented by line 202 of FIG. 5 and 212 of FIG. 7), the hydrostatic transmission is in a high torque, low speed operation. As the displacement of the motors decreases, represented by the curved portion of lines 198 and 200 of FIG. 5 and curve 244 of FIG. 6, torque drops off but speed increases. Still relatively high tractive effort is obtained during the work range. When the transmission is shifted to high range operation, generally indicated by curve 250 of FIG. 6, there is drive only through the two rear primary drive wheels having lower numerical gear ratio. This provides considerably less torque but a much higher speed range. When the control is in the high speed position and motors 76 and 76' are at the maximum displacement position (represented by line 210 in FIG. 5 and linear part 252 of line 250 in FIG. 6), there is a relatively lower tractive effort. Once the displacement of motor 76 and 76' start to decrease, there is a drop off in the tractive effort as represented by part 254 of curve 250. The slope of a line 250 however is considerably more gentle than the slope of the line 240 and thus tractive effort is maintained to a relatively high speed.

As can be ascertained by the aforesaid described structure and operation, the object of providing a variable displacement drive system with a control which brings the motor displacement to zero and declutches the drive from the motor ground engaging device has been illustrated and described in connection with the two particular embodiments illustrated, it will be apparent to those skilled in the art that various changes may be made therein without departing from the spirit of the invention as set forth in the appended claims.

We claim:

1. A positive displacement fluid drive transmission system for a vehicle having ground engaging means and including a prime mover, pump means driven by said prime mover, variable displacement fluid motor means, displacement control means operatively controllingly coupled to said motor means, fluid passageways means interconnecting said motor means to said pump means in driving relationship, clutch means drivingly connecting said motor means to said ground engaging means, said clutch means having an engaged position and a disengaged position, said transmission system characterized by said displacement control means for said motor means having a zero displacement position to preclude said motor means from being driven by said pump means, a multi-position control means controllingly coupled to both said clutch means and said displacement control means for said motor means, said multi position control means having a first position wherein said clutch means is in said engaged position and said motor means is driven and a second position wherein said clutch means is in said disengaged position and said motor displacement control means is in said zero displacement position.

2. The fluid transmission drive system of claim 1 wherein said displacement control means has a maximum displacement position wherein said motor means is driven at low speed and a normal minimum displacement position wherein said motor means is driven at high speed, and said multi-position control means moves said displacement control means from said minimum displacement position to said zero displacement position when said multi-position control means is moved from said first position to said second position.

3. The fluid transmission drive system of claim 1 wherein said ground engaging means includes four ground engaging wheels, said motor means comprising a first pair of motors each selectively driving one of a first pair of said wheels to provide an auxiliary drive and a second pair of motors each driving one of a second pair of said wheels to provide a primary drive, and said multi-position control means in said first position providing for wheel drive of said vehicle and in said second position providing two wheel drive of said vehicle.

4. The fluid transmission drive system of claim 3 including first gear means of a first gear ratio drivingly interconnecting said first pair of motors to said auxiliary drive, and second gear means of a second gear ratio numerically lower than said first gear ratio drivingly interconnecting said second pair of motors to said primary drive.

5. The fluid transmission drive system of claim 3 wherein said vehicle has a front end and a rear end, one of said vehicle ends being heavier than the other of said ends, said auxiliary drive being located closer to said heavier end than said primary drive.

6. The positive displacement fluid drive transmission system of claim 1 including speed signal means operatively connected to said motor means for producing a signal proportional to the speed of said motor means, said speed signal means controllingly connected to said multi-position control means to modulate the position thereof.

7. A positive displacement fluid drive transmission system for a vehicle having a primary drive and a selectively engaged auxiliary drive, said vehicle including an engine, a pump driven by said engine, first variable displacement motor means drivingly connected to said primary drive and in fluid communication with said pump to be driven thereby, second variable displacement motor means in fluid connection to said pump to be driven thereby, clutch means having an engaged position and a disengaged position, said clutch means selectively drivingly connecting said second motor means to said auxiliary drive, and control means operatingly coupled to said second motor means to vary the displacement thereof from a drive displacement position to a zero displacement position, said control means operatingly coupled to said clutch means to selectively position said clutch means, said control means having a first position placing said second motor means in said drive displacement position and said clutch in said engaged position, said control means having a second position placing said second motor means in said zero displacement position and said clutch means in said disengaged position.

8. The positive displacement fluid drive transmission system of claim 7 wherein said clutch means is fluid pressure engaged, said control means including a source of fluid pressure, a fluid drain, a fluid operated servo control connected to said second motor means to vary the displacement thereof and having first and second expandable chamber devices, said first expandable chamber device when connected to said source of fluid pressure causing the displacement of said second motor means to move toward said drive displacement position, said second expandable chamber device when connected to said source of fluid pressure causing the displacement of said second motor means to move toward said zero displacement position, and valve means having a first position connecting said clutch means and said first expandable chamber device to said source of fluid pressure and a second position connecting said second expandable chamber device to said source of fluid pressure and said clutch means to said drain.

9. The positive displacement fluid drive transmission system of claim 8 including second pump means drivingly connected to said second motor means to produce a fluid signal proportional to the speed of said second motor means, pilot means on said valve means, and a fluid connection between said second pump means and said pilot means, whereby said fluid signal acts as a bias on said valve means to modulate the position thereof.

10. A positive displacement fluid drive transmission system for a vehicle having ground engaging means, an engine, a pump driven by said engine, a variable displacement motor, fluid passageway means drivingly connecting said motor with said pump, a fluid operated clutch having an engaged position and a disengaged position for selectively drivingly connecting said motor to said ground engaging means, characterized by a fluid operated servo control for varying the displacement of said motor from a maximum displacement position to a zero displacement position, said servo control including an expandable chamber operatively connected to said motor to decrease the displacement thereof when said chamber is subjected to fluid pressure, and fluid control means to selectively operate said clutch and said servo control, said fluid control means including a source of fluid flow, a drain, a control fluid line connecting said source of fluid flow with said clutch and with said servo control, a first valve in said control fluid line for modulating flow therethrough and said first valve having a first position permitting fluid flow through said control fluid line and a second position blocking fluid flow through said control fluid line, speed signal means operatively connected to said motor for producing a signal proportional to the speed of said motor, fluid communication means between said speed signal means and said first valve to bias said first valve from said second position toward said first position upon an increase in motor speed, a second valve in said control fluid line biased by pressure in said control fluid line to move said second valve from a first position blocking flow from said control fluid line to said expandable chamber toward a second position connecting said control fluid line to said expandable chamber to decrease the displacement of said motor.

11. The positive displacement fluid drive transmission system of claim 10 wherein said fluid control means further includes a clutch valve in said control fluid line and having a first position permitting flow from said control fluid line to said clutch and a second position permitting flow from said clutch to said drain, pilot means on said clutch valve in fluid communication with said speed signal means to bias said clutch valve from said first position towards said second position upon an increase in motor speed.

12. The positive displacement fluid drive transmission system of claim 10 wherein said fluid control means further includes a shift valve, a fluid communication line interconnecting said drain and said control fluid line downstream of said first valve, said shift valve being in said fluid communication line, flow restriction means in said fluid communication line between said shift valve and said control fluid line, first valve pilot means in fluid communication with said flow communication line between said flow restriction and said shift valve, said first valve pilot means biasing said first valve in a direction opposite the bias of said speed signal means.

13. The positive displacement fluid drive transmission system of claim 12 wherein said fluid control means includes second flow restriction means in said flow communication line between said shift valve and drain, a shift signal line interconnecting said clutch valve and said flow communication line between said shift valve and said second flow restriction means, shift pilot means on said clutch valve for biasing said clutch valve from said first position to said second position, said shift pilot means on said clutch valve being in fluid communication with said shift signal line through said clutch valve when said clutch valve is in said second position to maintain such clutch valve in said second position when a shift signal by said shift valve is provided.

14. A positive displacement fluid drive transmission system for a vehicle having primary drive ground engaging means and auxiliary drive ground engaging means, said vehicle having an engine, a pump driven by said engine, first variable displacement motor means driven by said pump and drivingly connected to said primary drive ground engaging means, second variable displacement motor means driven by said pump, fluid operated clutch means having an engaged position and a disengaged position, said fluid operated clutch means selectively drivingly connecting said second motor means to said auxiliary drive ground engaging means, said system characterized by a first fluid operated servo control for varying the displacement of said first motor, a second fluid operated servo control for varying the displacement of said second motor, and fluid control means to selectively operate said clutch and said first and second servo control means, said fluid control means including a source of flow, a clutch valve for modulating the flow of fluid from said source to said clutch means, a first shift valve means for modulating the flow of fluid from said source to said first servo control, a second shift valve means for modulating the flow of fluid from said source to said second servo control, said fluid control means having a low range position and a high range position, said fluid control means when in said high range position positioning said first shift valve means to increase the flow of fluid from said source to said first servo control in a manner to increase the displacement of said first motor and positioning said second shift valve means to increase the flow of fluid from said source to said second servo control means in a manner to decrease the displacement of said second motor means while biasing said clutch valve toward a position to reduce the flow of fluid to said fluid operated clutch means.

* * * * *